United States Patent
Koya et al.

(10) Patent No.: US 6,875,489 B2
(45) Date of Patent: Apr. 5, 2005

(54) OPTICAL RECORDING MEDIUM

(75) Inventors: Kazuhiko Koya, Chiyoda-ku (JP); Hironobu Kato, Chiyoda-ku (JP); Koki Ikeda, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 10/488,704

(22) PCT Filed: Jul. 9, 2002

(86) PCT No.: PCT/JP02/06952
§ 371 (c)(1),
(2), (4) Date: Mar. 5, 2004

(87) PCT Pub. No.: WO2004/005371
PCT Pub. Date: Jan. 15, 2004

(65) Prior Publication Data
US 2004/0241375 A1 Dec. 2, 2004

(51) Int. Cl.$^7$ .................................................. B32B 3/02
(52) U.S. Cl. ................. 428/64.1; 428/64.4; 430/270.12
(58) Field of Search .............................. 428/64.1, 64.4, 428/913; 430/270.12, 495.1, 913

(56) References Cited

U.S. PATENT DOCUMENTS 6,159,572 A   12/2000   Kobayashi et al.
6,503,974 B1 * 1/2003   Ogasawara et al. .......... 524/495

FOREIGN PATENT DOCUMENTS

| JP | 2000-109669 | 4/2000 |
| JP | 2002-117580 | 4/2002 |

* cited by examiner

*Primary Examiner*—Elizabeth Mulvaney
(74) *Attorney, Agent, or Firm*—Wenderoth, Lind & Ponack, L.L.P.

(57) ABSTRACT

An optical recording medium which comprises a 0.3 to 2.0 mm-thick substrate made from a thermoplastic resin and having embossed pits or guide grooves, a reflection layer formed on the substrate and a 3 to 200 $\mu$m-thick transparent protective layer formed on the reflection layer and which reproduces recorded information based on a change in the intensity of reflected light by applying a light beam from the transparent protective layer side, wherein the substrate is formed from a polycarbonate resin having a specific chemical structure and a thermoplastic resin having specific physical properties.

According to the present invention, there is provided an optical recording medium for surface recording and reproduction having a simple structure. Particularly, there is provided an optical recording medium having high recording density.

25 Claims, 2 Drawing Sheets

Optical disk: 1
5: Transparent protective layer
4: Recording layer
3: Light reflection layer
2: Substrate

OPTICAL RECORDING MEDIUM

TECHNICAL FIELD

The present invention relates to an optical information recording medium and, more specifically, to an optical information recording medium for surface recording and reproduction.

BACKGROUND ART

In an ordinary optical disk such as CD or CD-ROM (to be referred to as "CD" hereinafter), embossed pits corresponding to recording data are formed on one side of a 1.2 mm-thick transparent substrate and a reflection film made from aluminum (Al) et al. is formed on the substrate. Information recorded on this CD is reproduced by applying converged beams from the side opposite to the reflection film side of the transparent substrate.

In contrast to this, in a DVD or DVD-ROM disk (to be referred to as "DVD" hereinafter) having a higher recording density than the above CD, finer embossed pits than those of the CD are formed on one side of a 0.6 mm-thick transparent substrate and a reflection film made from Al et al. is formed on the substrate. Information recorded on the recording side of the DVD is reproduced by applying converged beams from the side opposite to the reflection film side of the transparent substrate like the CD.

PC (polycarbonate) which is a transparent resin material is generally used as the material of the 0.6 mm-thick substrate. Since a 0.6 mm-thick PC substrate does not have satisfactory mechanical properties and is warped as it is, two 0.6 mm-thick PC substrates are assembled together in such a manner that their recording surfaces are adjacent to each other to form a 1.2 mm-thick disk having satisfactory mechanical properties.

The reason that the thickness of the DVD substrate is 0.6 mm is that a tilt margin is ensured. If the track pitch becomes narrower and the pit density becomes higher, the inclination of the disk so called "tilt margin" will be reduced. By reducing the thickness of the substrate from 1.2 mm to 0.6 mm, a tilt margin can be ensured but a reduction in mechanical strength cannot be avoided.

To reduce the thickness of the substrate and ensure mechanical strength at the same time, it is proposed that the center portion of a disk is made thick (JP-A 9-204686) (the term "JP-A" as used herein means an "unexamined published Japanese patent application"). However, to ensure mechanical strength, the limit thickness of the substrate of a signal recording area has been 0.6 mm. Although it is also reported that the thickness of a transparent substrate is set to 0.1 mm to 0.6 mm (JP-A 9-204688), the thickness of a protective substrate for holding a recording film and the thickness of a reflection film are not mentioned, thereby making it impossible to implement a disk.

However, in recent years, various new optical recording media have been proposed. For example, U.S. Pat. No. 5,972,459 (JP-A 11-7658) proposes an optical recording medium which comprises a substrate made from a thermoplastic resin and having a thickness of 0.3 to 1.2 mm, guide grooves on the above substrate, and a recording area consisting of at least a reflection film and a phase change recording film on the guide grooves in the mentioned order, a transparent protective film having a thickness of 3 to 177 $\mu$m being formed in at least the recording area, and which satisfies the following relationship:

$\Delta t \leq 5.26 \, (\lambda/N.A.^4) \, (\mu m)$ wherein $\Delta t$ is the thickness variation of the transparent protective layer, N.A. is the numerical aperture of an optical system for reproduction or recording/reproduction, and $\lambda$ is the wavelength of the optical system.

There is provided an optical recording medium whose capacity can be increased by specifying the relationship between the thickness of the transparent protective layer and the thickness variation of the layer.

Conditions required for an optical recording medium having a high recording density of 8 GB as one example of the above optical recording medium are obtained as follows. That is, the recording/reproduction optical system must satisfy $\lambda \leq 0.68 \, \mu m$ and $N.A./\lambda \leq 1.20$, the thickness t of the transparent protective layer in the recording area must be 3 to 177 $\mu$m, and the thickness variation of the transparent protective layer must satisfy the following expression.

$\Delta t \leq \pm 5.26 \, (\lambda/N.A.^4) \, (\mu m)$
Track pitch $P \leq 0.64 \, (\mu m)$
Tolerance $\Delta P \leq \pm 0.04 P \, (\mu m)$
Linear density $d \leq 0.1161/P \, (\mu m/bit)$
Disk skew $\Theta \leq 84.115 \times (\lambda/N.A.^3/t)$
Eccentricity $E \leq 67.57 P \, (\mu m)$
Surface roughness $Ra \leq \pm 3\lambda/100$ (within spot exposure area).

U.S. Pat. No. 6,159,572 (JP-A 11-296904) proposes as a one-sided recording system "an information recording medium which comprises a substrate having a recording face provided with embossed pits or guide grooves, a reflection film formed on the above recording face of the substrate, and a protective film formed on the reflection film, whose faces consist of a first face having the protective film formed thereon and a second face opposite to the first face, and which reproduces recorded information based on a change in the intensity of reflected light by applying a light beam from the first face side, wherein the distance between the recording face of the substrate and the first face is smaller than the thickness of the substrate and the first face is smooth."

The above publication also proposes as a both-sided recording system "an information recording medium which comprises a substrate having opposite first and second recording faces provided with embossed pits or guide grooves, first and second reflection films formed on the first and second recording faces of the substrate, and first and second protective films formed on the first and second reflection films, respectively, whose faces consist of the first face having the first protective film formed thereon and the second face having the second protective film formed thereon, and which reproduces recorded information based on a change in the intensity of reflected light by applying a light beam from the first face side and the second face side, wherein the distance between the first recording face of the substrate and the first face and the distance between the second recording face of the substrate and the second face is $5\lambda/(4n)$ to 0.6 mm ($\lambda$ is the wavelength of the light beam, and n is the refractive index of the first or second protective film of light having the above wavelength $\lambda$), the thickness of the substrate is 0.6 mm to 1.2 mm, and the distance between the first face and the second face is 1.2 mm or less."

The above publication is aimed to provide an information recording medium which ensures a sufficiently large tilt margin and mechanical strength even when its recording density is increased.

In these proposed recording media, the material of the substrate is not taken into special account. For example, U.S.

Pat. No. 6,159,572 enumerates acrylic resin such as polymethyl methacrylate (PMMA), polycarbonate resin, epoxy resin, styrene resin, glass, metals such as Al, alloys and ceramics as the materials of the substrate.

However, in the constitution of the above recording medium, it is difficult to avoid the occurrence of skew for the following reasons (1) to (4).

(1) at the time of injection: generation of stress by shearing stress when a resin flows in a cavity (molecular orientation distortion)
(2) Completion of filling: when a resin is filled in a cavity, a flow of the resin is abruptly stopped by the sudden stop of the movement of a screw, whereby the inertia forces of the resin and the screw are all applied to the substrate
(3) Pressure retention: Since pressure is applied to the resin for the prevention of a backflow of the resin and the prevention of sink caused by volume shrinkage until the gate is sealed at the time of injection, a pressure distribution occurs in the whole substrate.
(4) Cooling: stress is generated by thermal shrinkage according to a temperature distribution.

Therefore, to improve the skew, JP-A 11-242829 proposes "an optical recording medium which comprises at least a recording layer and a transparent protective layer on a substrate in the mentioned order, for recording and/or reproducing an information signal by applying light from the transparent protective layer side, wherein the substrate comprises a first resin layer for forming a face on which the recording layer is formed and a second resin layer which is formed on the first resin layer and made from a resin material having a higher flexural modulus than the resin material forming the first resin layer."

Meanwhile, even when the problem with mechanical properties is solved by the above improvement, in an optical recording medium for recording a signal on one side, the deformation of a disk is caused by moisture absorption due to environmental temperature and humidity variations.

In the case of a DVD, a polycarbonate substrate having a water absorption of 0.3% or more is used but two 0.6 mm disks are assembled together in such a manner that their signal recording sides become adjacent to each other. Therefore, even if the water absorptions of the disks are high, water absorption is well balanced and deformation hardly occurs. However, since a high-density disk having high N.A. (numerical aperture) has a signal recording layer on one surface layer, water absorption is imbalanced, thereby causing water absorption deformation. Particularly, during driving, a focus error readily occurs such that a signal cannot be read due to the deformation of a disk because a drastic change easily occurs from a high temperature and a low humidity in the disk drive.

To suppress such water absorption deformation, U.S. Pat. No. 6,201,783 (JP-A 2000-11449) proposes "a disk-like information recording medium which comprises a substrate, a recording layer, formed on the substrate, for recording an information signal, and a transparent protective layer laminated on the recording layer and which records and reproduces an information signal by applying light from the transparent protective layer side, wherein the substrate comprises a resin core layer and resin surface layers integrated with the core layer, having irregularities for information signals on the recording layer on one side and having fluidity compared with the core layer. A resin having a water absorption of 0.3% or less is used as the surface layer resin of the substrate. It is proposed to solve the above problem with the complicated structure of the substrate formed by two-color molding or sandwich molding.

Problems to be Solved by the Invention

In view of the trend of the above-described prior art, the inventors of the present invention have conducted intensive studies to provide a substrate for an optical recording medium of the above system having a simple structure without making it complicated in structure and have attained the present invention.

Means for Solving the Problems

According to researches conducted by the inventors of the present invention, the above object of the present invention is attained by an optical recording medium which comprises a 0.3 to 2.0 mm-thick substrate made from a thermoplastic resin and having embossed pits or guide grooves, a reflection layer formed on the substrate and a 3 to 200 $\mu$m-thick transparent protective layer formed on the reflection layer and which reproduces recorded information based on a change in the intensity of reflected light by applying a light beam from the surface side of the transparent protective layer, wherein the substrate is formed from (i) a thermoplastic resin which comprises at least 50 wt % of an aromatic polycarbonate resin obtained by polymerizing a dihydroxy compound containing at least one aromatic dihydroxy compound selected from the group consisting of 1,1-bis(4-hydroxyphenyl)-3,3,5-trimethylcyclohexane and 9,9-bis(4-hydroxy-3-methylphenyl)fluorene in an amount of at least 20 mol % based on the total of all the dihydroxy compounds as a bisphenol component; or more generally, the substrate is formed from (ii) a thermoplastic resin having the following properties (1) to (4):
(1) a flexural modulus of 24,000 kgf/cm$^2$ or more,
(2) a saturation water absorption of 0.33 wt % or less,
(3) a deflection temperature under load of 125° C. or higher, and
(4) a loss tangent (tan $\delta$) of 0.006 or more.

The optical recording medium of the present invention records and reproduces a recorded information by applying a light beam from the surface side of the transparent protective layer having a thickness of 3 to 200 $\mu$m. This optical recording medium can record and reproduce a large volume of information and can be used as an optical recording medium using a short wavelength laser (for example, blue purple semiconductor laser having a wavelength of 405 nm). This optical recording medium is called "Blue-ray Disc" to distinguish it from conventional CD's and DVD's.

BEST MODE FOR CARRYING OUT THE INVENTION

Figure 1:
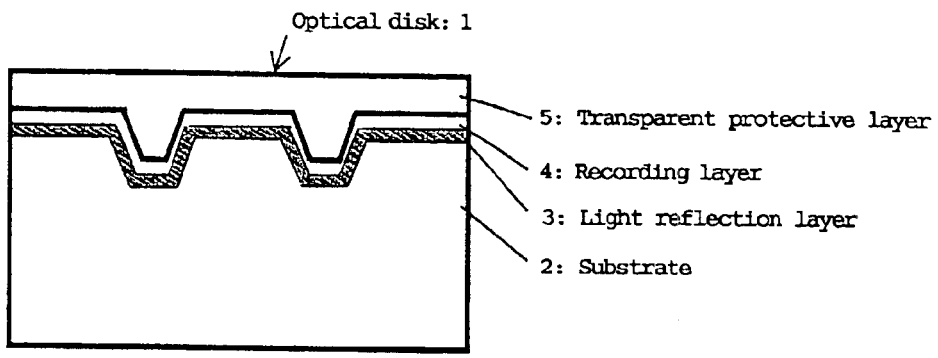
FIG. 1 is a partial vertical sectional view to the disk plane of an example of an optical recording medium according to the present invention.
Figure 2:
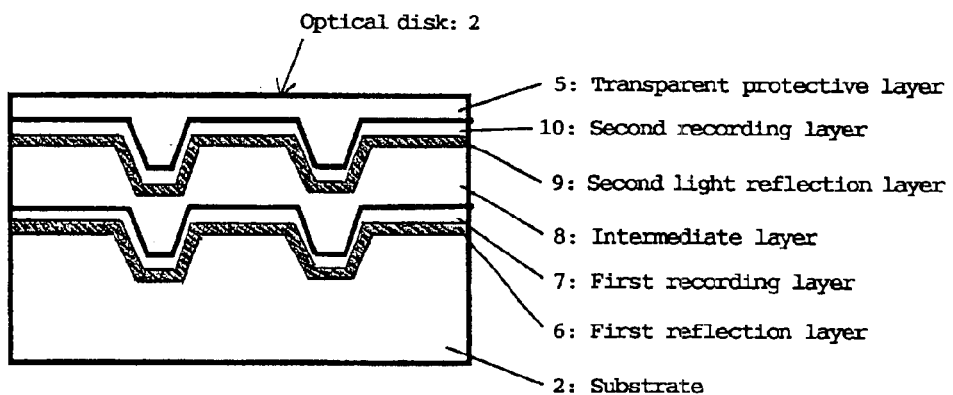
FIG. 2 is a partial vertical sectional view to the disk plane of another example of an optical recording medium according to the present invention.
Figure 3:
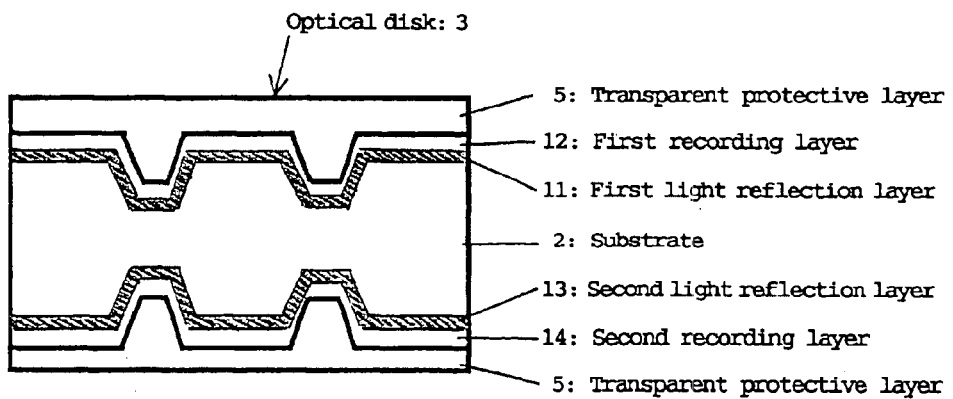
FIG. 3 is a partial vertical sectional view to the disk plane of still another example of an optical recording medium according to the present invention.

An optical recording medium according to a preferred embodiment of the present invention will be described in detail hereinbelow with reference to the accompanying drawings. FIGS. 1 to 3 are partial vertical sectional views to the disk plane of examples of the optical recording medium of the present invention. The constitution of an optical recording medium proposed by the present invention is not limited to examples described herein.

As shown in FIG. 1, the optical recording medium 1 to which the present invention is applied has a light reflection layer 3, a recording layer 4 and a transparent protective layer 5 formed on a substrate 2 having guide grooves in the mentioned order. Phase pits or guide grooves formed of a predetermined uneven pattern such as fine irregularities including pre-grooves in which data information and tracking servo signals are recorded are formed on the surface of the substrate 2.

As shown in FIG. 2, the optical recording medium 2 has a multi-layer structure consisting of a plurality of layers including recording films or reflection layers and a transparent protective layer on the substrate 2 having guide grooves. As shown in FIG. 3, the optical recording medium 3 has embossed pits or guide grooves formed on both sides of the substrate 2 and a reflection layer and a transparent protective layer laminated on the both sides in the mentioned order. The substrate, light reflection layer, recording layer and transparent protective layer constituting these optical recording media (optical disks) may be made from the same material or materials having similar characteristic properties.

The substrate constituting the optical recording medium (may be referred to as "optical disk" hereinafter) of the present invention will be described in more detail hereinunder.

The substrate 2 has a thickness of 0.3 to 2.0 mm, preferably 0.5 to 1.1 mm. The transparent protective layer has a thickness of 3 to 200 μm, preferably 10 to 120 μm, and the total thickness of the substrate and the transparent protective layer is actually about 1.2 mm in the case of the optical recording medium shown in FIG. 1.

The flexural modulus of the thermoplastic resin used in the substrate 2 is preferably 24,000 kgf/cm$^2$ or more, more preferably 26,000 kgf/cm$^2$ or more, the most preferably 27,000 kgf/cm$^2$ or more. When the flexural modulus is lower than 24,000 kgf/cm$^2$, the disk vibrating of the molded optical disk which occurs when it turns at a high speed becomes marked, which is not preferred as an optical disk which requires a high-density recording capacity. The flexural modulus is preferably high if moldability can be retained. It is generally 37,000 kgf/cm$^2$ or less, preferably 35,000 kgf/cm$^2$ or less.

The thermoplastic resin in the present invention has a saturation water absorption when immersed in pure water at 23° C. of preferably 0.33 wt % or less, more preferably 0.30 wt % or less. It is the most preferably 0.27 wt % or less. When the saturation water absorption is larger than 0.33 wt %, the warp deformation of the optical disk readily occurs in moisture absorption and moisture desorption steps, whereby a focus error or tracking error tends to occur disadvantageously.

As for the warp deformation of the optical disk in the moisture absorption and moisture desorption steps, the following measurement method was used. That is, time changes in the tilt of a portion 58 mm away from the center which occurs when the disk is exposed to an environment in which the temperature is 30° C. and the humidity is 90% RH (environment A) until saturation water absorption is reached and then transferred to an environment in which the temperature is 23° C. and the humidity is 50% RH (environment B) are measured and the difference (ΔTilt) between the maximum value of a change in tilt and a value when the tilt becomes steady is obtained. ΔTilt of the disk at this point is 0.60 or less, preferably 0.50 or less.

The thermoplastic resin in the present invention has a deflection temperature (HDT) under load measured at 1.82 MPa in accordance with ASTM D-648 of preferably 125° C. or higher, more preferably 127° C. or higher, the most preferably 129° C. or higher. When the deflection temperature under load is low, the heat resistance of the disk becomes unsatisfactory. The deflection temperature under load is generally 150° C. or lower, preferably 140° C. or lower when general injection molding is used.

Further, the thermoplastic resin has a loss tangent (tan δ) measured at 40° C. and 18 Hz in accordance with ISO 6721-4 of preferably 0.006 or more, more preferably 0.008 or more, the most preferably 0.01 or more. When the loss tangent (tan δ) is smaller than 0.006, the damping properties of the resin deteriorate and the disk vibrating of the molded optical disk which occurs when it turns at a high speed becomes marked. The upper limit of loss tangent (tan δ) is generally 0.08, preferably 0.07.

Since the disk substrate of the present invention is aimed to achieve a high-density recording capacity, the resin must have high transcribility to guide grooves at the time of molding. The resin should have a transcribility of 95% or more, preferably 98% or more when measured in accordance with a method which will be described hereinafter.

Since the optical recording medium of the present invention records and/or reproduces an information signal by applying light from the transparent protective layer 5 side, the substrate 2 does not have an influence upon optical recording and/or reproduction properties and does not need to have transparency. As a blend material of two or more resins which greatly differ from each other in refractive index becomes hazy by light scattering, it has not been easy to use it as a substrate material for conventional CD's and DVD's which require optical properties. As described above, a blend material of two or more resins which greatly differ from each other in refractive index may be used in the substrate 2 of the present invention.

Examples of the thermoplastic resin are given below. However, the thermoplastic resin forming the substrate of the present invention is not limited to the following examples if it satisfies the above requirements (1) to (4).

The thermoplastic resin in the present invention must be a resin which has a low water absorption and excellent damping properties and flexural modulus, is essentially composed of a resin having high heat resistance as a disk material and satisfies the above requirements. This thermoplastic resin can be selected from polycarbonate resin, amorphous polycyclic olefin and hydrogenated polystyrene. A thermoplastic resin which is essentially composed of a polycarbonate resin is preferred.

The above polycarbonate resin is generally obtained by solution polymerizing or melt polymerizing an aromatic dihydroxy compound and a carbonate bonded precursor. Any aromatic dihydroxy compound is acceptable if it satisfies the above conditions. Examples of the aromatic dihydroxy compound include 2,2-bis(3-methyl-4-hydroxyphenyl)propane, 1,1-bis(4-hydroxyphenyl)cyclohexane, 1,1-bis(4-hydroxyphenyl)-3,3,5-trimethylcyclohexane, 9,9-bis(3-methyl-4-hydroxyphenyl)fluorene and α,α'-bis(4-hydroxyphenyl)m-diisopropylbenzene. The above α,α'-bis(4-hydroxyphenyl) m-diisopropylbenzene is a compound represented by the following chemical formula.

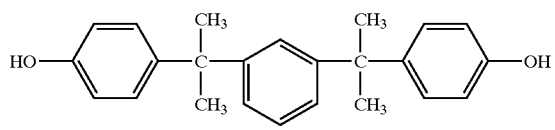

The polycarbonate resin may be a homopolycarbonate obtained by homopolymerizing the above aromatic dihydroxy compound or a copolycarbonate obtained by copolymerizing two or more aromatic dihydroxy compounds. Further, it may be a copolycarbonate obtained by polymerizing the above aromatic dihydroxy compound with other dihydroxy compound. Examples of the other dihydroxy compound include 2,2-bis(4-hydroxyphenyl)propane (bisphenol A). A polycarbonate resin obtained by homopolymerizing bisphenol A is not a resin which satisfies all the above requirements (1) to (4) of the present invention. The polycarbonate resins may be used alone or as a blend of two or more.

The resin composition is preferably a thermoplastic resin which comprises at least 50 wt % of an aromatic polycarbonate resin obtained by polymerizing a dihydroxy compound containing at least one aromatic dihydroxy compound (component A) selected from the group consisting of 1,1-bis(4-hydroxyphenyl)-3,3,5-trimethylcyclohexane (component a-1) and 9,9-bis(4-hydroxy-3-methylphenyl)fluorene (component a-2) in an amount of at least 20 mol % based on the total of all the dihydroxy compounds as a bisphenol component.

The thermoplastic resin is more preferably a copolycarbonate resin obtained by reacting a bisphenol component containing 1,1-bis(4-hydroxyphenyl)-3,3,5-trimethylcyclohexane and/or 9,9-bis(4-hydroxy-3-methylphenyl)fluorene and α,α'-bis(4-hydroxyphenyl)m-diisopropylbenzene in a molar ratio of 20:80 to 70:30, preferably 40:60 to 70:30 with a carbonate precursor, or a blend carbonate composition thereof.

It may be a blend of at least 50 wt % of the copolycarbonate resin and other resin (preferably other polycarbonate resin).

The polycarbonate resin has a specific viscosity of preferably 0.2 to 0.5, more preferably 0.25 to 0.4 when measured at 20° C. by dissolving 0.7 g of the polymer in 100 ml of methylene chloride. When the specific viscosity is lower than 0.2, the molded product becomes fragile and when the specific viscosity is higher than 0.5, melt fluidity becomes worse, a molding failure occurs and it is difficult to obtain a molded product which is optically excellent.

The thermoplastic resin of the present invention may be mixed with at least one phosphorus compound selected from the group consisting of phosphoric acid, phosphorous acid, phosphonic acid, phosphonous acid and esters thereof as a thermal stabilizer. These phosphorus compounds may be condensates. By blending a phosphorus compound, the thermal stability of the resin for an optical disk is improved and a reduction in molecular weight and the deterioration of color at the time of molding are prevented.

The amount of the thermal stabilizer is 0.0001 to 0.05 wt %, preferably 0.0005 to 0.02 wt %, particularly preferably 0.001 to 0.01 wt % based on the thermoplastic resin.

A generally known antioxidant may be added to the thermoplastic resin of the present invention to prevent oxidation. An example of the antioxidant is a phenol-based antioxidant. The amount of the antioxidant is preferably 0.0001 to 0.05 wt % based on the thermoplastic resin.

A higher fatty acid ester of a monohydric alcohol or polyhydric alcohol may be optionally added to the thermoplastic resin of the present invention. By blending a higher fatty acid ester of a monohydric or polyhydric alcohol, releasability from a mold at the time of molding the thermoplastic resin is improved, and a release load in the molding of a disk substrate becomes small, thereby making it possible to prevent the deformation of the disk substrate and pit dislocation caused by a release failure. The melt fluidity of the thermoplastic resin is also improved.

The amount of the ester of an alcohol and a higher fatty acid is 0.01 to 2 wt %, preferably 0.015 to 0.5 wt %, more preferably 0.02 to 0.2 wt % based on the thermoplastic resin.

Additives such as other thermoplastic resin, optical stabilizer, colorant, antistatic agent and lubricant may be added to the resin for an optical disk substrate of the present invention in limits that transcribility and the effect of reducing warp in the moisture absorption and moisture desorption steps of the molded disk are not impaired.

In the preparation of the resin composition of the present invention, it is conceivable that mixing of polycarbonate resins and/or mixing of a polycarbonate resin and other resin is carried out in the stage of a polymer solution or a molded article such as a particle or pellet. It is not particularly limited. As for means of mixing, in the stage of a polymer solution, a vessel equipped with a stirrer is mainly used, and in the stage of a molded product such as a particle or pellet, a tumbler, twin-cylinder mixer, Nauter mixer, Banbury mixer, kneading roll or extruder may be used. In either case, any technique may be used and not particularly limited. It is preferred from the simplicity of a method of removing foreign matter during the mixing operation that after the mixing of a polymer solution, it should be let pass through a filter having an appropriate opening size.

To mix a polycarbonate resin with other resin as a solution, a solvent which can dissolve the polycarbonate resin and the other resin is preferably used. In this case, the solution is preferably filtered to remove impurities and foreign matter such as an unreacted component. Further, in the extrusion step for obtaining a pellet-like resin composition (pelletizing step) to be injection molded, it is preferred that foreign matter be removed by letting the molten resin composition pass through a sintered metal filter or the like having a filtration accuracy of 50 μm or less. If necessary, an additive such as a phosphorus-based antioxidant is preferably added. The contents of foreign matter, impurities and solvent in raw material resins before injection molding must be reduced as much as possible.

A description is subsequently given of the method of molding an optical disk.

To produce an optical disk substrate from the above resin for an optical disk substrate, an injection molding machine (including an injection compression molding machine) equipped with a stamper having pits and grooves which satisfy specifications required for an optical recording medium and a surface accuracy is used to form an optical disk substrate by injection molding. The thickness of the disk substrate is 0.3 to 2.0 mm. This injection molding machine may be a generally used machine but preferably a machine made from a material whose cylinder and screws have low adhesion to resins, corrosion resistance and abrasion resistance in order to suppress the production of a carbide and improve the reliability of a disk substrate. The environment of the molding step is preferably as clean as possible in view of the object of the present invention. It is also important that the material to be molded should be fully dried to remove water and that residence which might cause the decomposition of a molten resin should be avoided.

The resin for an optical disk substrate of the present invention preferably has sufficiently high fluidity which is advantageous for transcribility during injection molding or injection compression molding.

An optical disk can be produced by forming at least a reflection film on one side of the optical disk substrate of the present invention. The material of the reflection film is elemental metal or composite metal. Al or Au is used alone, or an Al alloy containing Ti in an amount of 0.5 to 10 wt %, preferably 3.0 to 10 wt % or an Al alloy containing Cr in an amount of 0.5 to 10 wt % is preferably used. The reflection film can be formed by ion beam sputtering, DC sputtering or RF sputtering.

Only this metal thin film (reflection layer) suffices but a recording layer 4 (a phase change film and a dye in the case of DVD-RAM and DVD-R, and an magnetic-optical recording film in the case of an magneto-optical disk) and a transparent protective layer 5 are formed besides the reflection layer to obtain the optical disk of the present invention.

The phase change film recording material layer is made from chalcogen alone or a chalcogen compound. Specifically, Te, Se or chalcogenite-based material such as Ge—Sb—Te, Ge—Te, In—Sb—Te, In—Se—Te—Ag, In—Se, In—Se—Tl—Co, In—Sb—Se, $Bi_2Te_3$, BiSe, $Sb_2Se_3$ or $Sb_2Te_3$ may be used.

A vertically magnetized film having magneto-optic properties including Kerr effect or Faraday effect such as an amorphous alloy thin film of Tb—Fe—Co is used as the magneto-optical recording film layer.

The transparent protective layer 5 is formed on the recording layer 4. This transparent protective layer 5 is made from a material which transmits laser light, as exemplified by thermoplastic resins such as polycarbonates and amorphous polycyclic olefin resins and thermosetting resins.

To form the transparent protective layer, a transparent sheet or glass made from a thermoplastic resin such as polycarbonate or amorphous polycyclic olefin resin is assembled with the recording layer 4, or an ultraviolet light curable resin is applied to the recoding layer 4 by spin coating and exposed to ultraviolet light to form the transparent protective layer. Further, the thickness of this transparent protective layer is limited to 3 to 200 $\mu$m in order to suppress coma-aberration.

The transparent protective layer is preferably formed from a transparent resin which satisfies the same requirements (1) to (4) as the thermoplastic resin of the substrate of the present invention, particularly preferably the same resin as the substrate.

The basic constitution of the optical recording medium (optical disk) of the present invention has been described above. A dielectric layer may be added to the above constitution to control the optical properties and thermal properties of the optical recording medium. In this case, the light reflection layer 3, first dielectric layer, recording layer 4, second dielectric layer and transparent protective layer 5 can be formed on the substrate 2 in the mentioned order.

EXAMPLES

The following examples are given to further illustrate the present invention. "Parts" in the examples means "parts by weight". Evaluations are made in accordance with the following methods.

(1) Deflection Temperature Under Load
This was measured under a load of 1.82 MPa in accordance with ASTM D-648.
(2) Saturation Water Absorption
20 days after 6 g of a 1.2 mm-thick sheet was immersed in pure water at 23° C., its weight change rate was measured.
(3) Flexural Modulus
A test sample prepared by drying a pellet at 120° C. for 5 hours and injection molding it at a cylinder temperature of 340° C. with an injection molding machine [SG-150 of Sumitomo Heavy Industries, Ltd.] was used to measure its flexural modulus in accordance with ASTM D-0790.
(4) Production Method of Standard Disk
A disk substrate having a diameter of 120 mm and a thickness of 1.2 mm was injection molded from each pellet using the M35B-D-DM equipped with a stamper having a groove depth of 40 nm and a groove pitch of 0.6 $\mu$m manufactured by Meiki Co., Ltd. Table 1 shows the molding conditions of each substrate (conditions for providing high transcribility). Thereafter, a reflection film, dielectric layer 1, phase change recording film and dielectric film 2 were formed on the injection molded disk substrate by sputter deposition in the mentioned order and a polycarbonate thin film cover layer was assembled with the resulting laminate to obtain an optical disk of interest.
Reflection layer: 100 nm-thick Ag Pt Pd Cu alloy layer (TTP40-A of Unaxis Co., Ltd.)
Dielectric layer 1: 15 nm-thick ZnS $SiO_2$ layer
Phase change recording layer: 15 nm-thick GeSbTe layer
Dielectric layer 2: 40 nm-thick ZnS $SiO_2$ layer
Cover layer: 80 $\mu$m-thick polycarbonate (C-1400 of Teijin Chemicals Ltd.) layer provided with a 20 $\mu$m-thick isocyanate crosslinked acrylic adhesive layer.
(5) Initial Mechanical Properties
10 disks were left at a temperature of 23° C. and a humidity of 50% RH for 2 days or more while a spacer was interposed between adjacent disks so that the disks did not contact one another. When a tilt change caused by heat shrinkage and environmental variations became stable, the evaluation of tilt (initial disk form) was carried out with the DLD-3000U 3-D form measuring instrument of Japan EM Co., Ltd. to obtain their initial mechanical properties. The value is an average value of the 10 disks.
(6) Transcribility
The groove depth (d) at a radius of 58 mm of each substrate produced for the measurement of the above initial mechanical properties (4) was measured with the AFM-3800N of Seiko Instruments Inc. to obtain transcribility from the following equation.
Transcribility (%)=[d/40]×100
(7) $\Delta$Tilt
The disk whose initial mechanical properties have been evaluated was exposed to an environment in which the temperature was 30° C. and the humidity was 90% RH (environment A) until its saturation water absorption was reached and transferred to an environment in which the temperature was 23° C. and the humidity was 50% RH (environment B).
After transfer, time changes in the tilt of a portion 58 mm away from the center caused by environmental variations were measured with the DLD-3000U 3-D form measuring instrument of Japan EM Co., Ltd. to obtain a difference between the maximum value of a tilt change and a value when the tilt became steady as $\Delta$Tilt.
(8) Loss Tangent (tan $\delta$)
This was measured at 40° C. and 18 Hz with the RDAII of Rheometrics Co., Ltd. in accordance with ISO 6721-4.

Example 1

929.2 parts of ion exchange water and 61.3 parts of a 48% aqueous solution of sodium hydroxide were fed to a reactor equipped with a thermometer, stirrer and reflux condenser, 43.9 parts of 1,1-bis(4-hydroxyphenyl)-3,3,5-trimethylcyclohexane (component a-1), 43.6 parts of α,α'-bis(4-hydroxyphenyl)m-diisopropylbenzene (component a-2) and 0.17 part of hydrosulfite were dissolved in the resulting solution, 1.51 parts of p-tert-butylphenol, 637.9 parts of methylene chloride and 0.09 part of triethylamine were added, and 32.4 parts of phosgene was blown into the obtained solution under agitation at 15 to 25° C. in 40 minutes. After the blowing of phosgene, 15.6 parts of a 48% aqueous solution of sodium hydroxide was added and stirred at 28 to 33° C. for 1 hour to terminate a reaction. After the end of the reaction, the product was diluted with methylene chloride, rinsed, made acidic by the addition of hydrochloric acid and rinsed. When the conductivity of a water phase became almost the same as ion exchange water, methylene chloride was evaporated with a kneader provided with an isolated chamber having a foreign matter take-out port in a bearing to obtain 86.4 parts of an achromatic polymer comprising the component a-1 and the component a-2 in a molar ratio of 53:47 and having a specific viscosity of 0.27 (yield of 97%).

Figure 4:
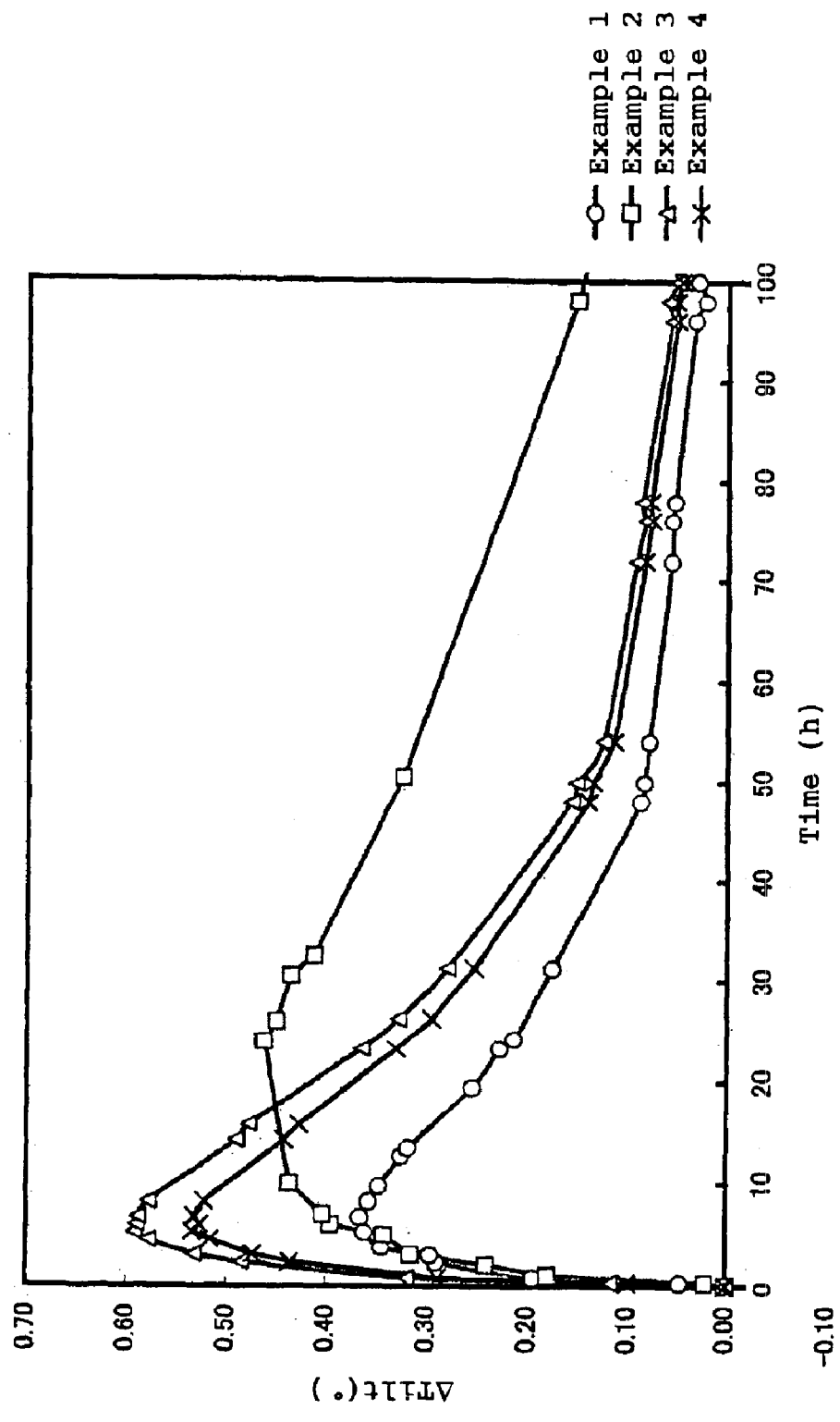
FIG. 4 shows time changes in the tilt of a portion 58 mm away from the center of an optical disk caused by environmental variations based on the tilt at a stable time.

0.005% of trisnonylphenyl phosphate, 0.003% of trimethyl phosphate and 0.030% of monoglyceride stearate were added to this polycarbonate resin particle, the resulting mixture was pelletized with a 30 mm-diameter vented double-screw extruder, and the pellet was injection molded into a disk substrate having a diameter of 120 mm and a thickness of 0.6 mm with the M35-D-DM of Meiki Co., Ltd. An optical disk was manufactured using this disk substrate in accordance with a standard disk production process. The initial mechanical properties, ΔTilt and loss tangent of this disk were evaluated. The evaluation results and changes in the tilt of a portion 58 mm away from the center (based on a value at a stable time) caused by environmental variations are shown in Table 1 and FIG. 4.

Example 2

32,165 parts of ion exchange water and 1,757 parts of sodium hydroxide were fed to a reactor equipped with a thermometer, stirrer, reflux condenser and phosgene blow-in tube, 2,213 parts of 9,9-bis(3-methyl-4-hydroxyphenyl)fluorene (component a-3), 3,039 parts of α,α'-bis(4-hydroxyphenyl)m-diisopropylbenzene (component a-4) and 11 parts of hydrosulfite were dissolved in the resulting solution, 10,950 parts of methylene chloride was added, and 1,667 parts of phosgene was blown into the solution at 16 to 18° C. under agitation in 60 minutes. After the blowing of phosgene, 92 parts of p-tert-butylphenol and 293 parts of sodium hydroxide were added and further 4 parts of triethylamine was added and stirred at 30° C. for 1 hour to terminate a reaction. After the end of the reaction, the product was diluted with methylene chloride, rinsed, made acidic by the addition of hydrochloric acid and rinsed. When the conductivity of a water phase became almost the same as ion exchange water, methylene chloride was evaporated by a kneader to obtain 5,550 parts of a white particle comprising the component a-3 and the component a-4 in a molar ratio of 40:60 (yield of 96%). This particle had a specific gravity of 0.245 and a secondary transition temperature (Tg) of 143° C. 0.005% of trisnonylphenyl phosphate, 0.003% of trimethyl phosphate and 0.03% of monoglyceride stearate were added to this resin particle, the resulting mixture was pelletized with a 30 mm-diameter vented double-screw extruder, and the pellet was injection molded into a disk substrate having a diameter of 120 mm and a thickness of 1.2 mm with the M35B-D-DM of Meiki Co., Ltd. A standard disk was obtained using this disk substrate. The initial mechanical properties, ΔTilt and loss tangent of this disk were evaluated. The evaluation results and changes in the tilt of a portion 58 mm away from the center (based on a value at a stable time) caused by environmental variations are shown in Table 1 and FIG. 4.

Example 3

(A) Synthesis of Polycarbonate Homopolymer (Polymer A) from Bisphenol A 11,057 parts of ion exchange water and 1,560 parts of a 48% aqueous solution of sodium hydroxide were fed to a reactor equipped with a thermometer, stirrer and reflux condenser, 2,134 parts of bisphenol A and 2.1 parts of hydrosulfite were dissolved in the resulting solution, 6,445 parts of methylene chloride was added, and 1,005 parts of phosgene was blown into the solution at 15 to 20° C. under agitation in 60 minutes. After the blowing of phosgene, 92 parts of p-tert-butylphenol and 830 parts of a 48% aqueous solution of sodium hydroxide were added, stirred and emulsified, and further 0.09 part of triethylamine was added and stirred at 28 to 33° C. for 1 hour to terminate a reaction. After the end of the reaction, the product solution was separated by centrifugation at a flow rate of ion exchange water of 1,000 ml/min, a flow rate of the reaction product solution of 1,500 ml/min and a revolution of 3,500 rpm with the Ultrex EP-02 centrifugal extruder with a porous plate of Hitachi, Ltd., a methylene chloride phase was made acidic by the addition of hydrochloric acid, and the centrifugation operation was repeated under the same conditions. When the conductivity of a water phase became almost the same as ion exchange water, methylene chloride was evaporated by a kneader provided with an isolated chamber having a foreign matter take-out port in a bearing to obtain 2,400 parts of a particulate achromatic polycarbonate resin (yield of 92%).

(B) Synthesis of Polycarbonate Copolymer (Polymer B)

929.2 parts of ion exchange water and 61.3 parts of a 48% aqueous solution of sodium hydroxide were fed to a reactor equipped with a thermometer, stirrer and reflux condenser, 43.9 parts of 1,1-bis(4-hydroxyphenyl)-3,3,5-trimethylcyclohexane (component a-1), 43.6 parts of α,α'-bis(4-hydroxyphenyl)m-diisopropylbenzene (component a-2) and 0.17 part of hydrosulfite were dissolved in the resulting solution, 1.51 parts of p-tert-butylphenol, 637.9 parts of methylene chloride and 0.09 part of triethylamine were added, and 32.4 parts of phosgene was blown into the solution at 15 to 25° C. under agitation in 40 minutes. After the blowing of phosgene, 15.6 parts of a 48% aqueous solution of sodium hydroxide was added and stirred at 28 to 33° C. for 1 hour to terminate a reaction. After the end of the reaction, the product was diluted with methylene chloride, rinsed, made acidic by the addition of hydrochloric acid and rinsed. When the conductivity of a water phase became almost the same as ion exchange water, methylene chloride was evaporated by a kneader provided with an isolated chamber having a foreign matter take-out port in a bearing to obtain 86.4 parts of an achromatic polymer comprising the component a-1 and the component a-2 in a molar ratio of 53:47 and having a specific gravity of 0.27 (yield of 97%).

(C) Preparation of Resin Composition

The methylene chloride solution of the bisphenol A homopolymer (polymer A) synthesized in (A) and the methylene chloride solution of the copolymer as the polymer B synthesized in (B) were fed to a vessel equipped with a stirrer in a polymer weight ratio (polymer A: polymer B) of 80:20, stirred and mixed together. After mixing, the resulting mixture was let pass through a filter having an opening size of 0.3 μm and fed to a kneader provided with an isolated chamber having a foreign matter take-out port in a bearing to evaporate methylene chloride so as to obtain the polycarbonate resin particle. 0.005% of trisnonylphenyl phosphate, 0.003% of trimethyl phosphate and 0.03% of monoglyceride stearate were added to this resin particle, and the resulting mixture was pelletized with a 30 mm-diameter vented double-screw extruder, and a disk substrate having a diameter of 120 mm and a thickness of 1.2 mm was injection molded from the pellet with the M35B-D-DM of Meiki Co., Ltd. A standard disk was obtained using this disk substrate. The initial mechanical properties, ΔTilt and loss tangent of this disk were evaluated. The evaluation results and changes in the tilt of a portion 58 mm away from the center (based on a value at a stable time) caused by environmental variations are shown in Table 1 and FIG. 4.

Example 4

The methylene chloride solution of the bisphenol A homopolymer (polymer A) synthesized in (A) and the methylene chloride solution of the copolymer as the polymer B synthesized in (B) of Example 3 were fed to a vessel equipped with a stirrer in a polymer weight ratio (polymer A: polymer B) of 60:40, stirred and mixed together. After mixing, the resulting mixture was let pass through a filter having an opening size of 0.3 μm and fed to a kneader provided with an isolated chamber having a foreign matter take-out port in a bearing to evaporate methylene chloride so as to obtain the polycarbonate resin particle.

0.005% of trisnonylphenyl phosphate, 0.003% of trimethyl phosphate and 0.03% of monoglyceride stearate were added to this resin particle, the resulting mixture was pelletized with a 30 mm-diameter vented double-screw extruder, and a disk substrate having a diameter of 120 mm and a thickness of 1.2 mm was injection molded from the pellet with the M35B-D-DM of Meiki Co., Ltd. A standard disk was obtained using this disk substrate. The initial mechanical properties, ΔTilt and loss tangent of this disk were evaluated. The evaluation results and changes in the tilt of a portion 58 mm away from the center (based on a value at a stable time) caused by environmental variations are shown in Table 1 and FIG. 4.

Example 5

87.5 parts of an achromatic polymer comprising the component a-1 and the component a-2 in a molar ratio of 47/53 was obtained (yield of 98%) in the same manner as in Example 1 except that the amount of the component a-1 was changed to 38.9 parts and the amount of the component a-2 was changed to 49.1 parts.

An optical disk was manufactured in the same manner as in Example 1 to evaluate its characteristic properties. The characteristic properties of the optical disk were the same as those of Example 1.

Comparative Example 1

A disk substrate having a diameter of 120 mm and a thickness of 1.2 mm was injection molded from the polymethyl methacrylate (VLD-100) of Rhome and Harse Japan Co., Ltd. with the M35B-D-DM of Meiki Co., Ltd. A standard disk was manufactured using this disk substrate. The initial mechanical properties, ΔTilt and loss tangent of this disk were evaluated. The evaluation results and changes in the tilt of a portion 58 mm away from the center (based on a value at a stable time) caused by environmental variations are shown in Table 1 and FIG. 4.

Comparative Example 2

A disk substrate having a diameter of 120 mm and a thickness of 1.2 mm was injection molded from the polystyrene (HF77) of A and M styrene Co., Ltd. with the M35B-D-DM of Meiki Co., Ltd. A standard disk was obtained using this disk substrate. The initial mechanical properties, ΔTilt and loss tangent of this disk were evaluated. The evaluation results and changes in the tilt of a portion 58 mm away from the center (based on a value at a stable time) caused by environmental variations are shown in Table 1 and FIG. 4.

Comparative Example 3

A disk substrate having a diameter of 120 mm and a thickness of 1.2 mm was injection molded from the polycarbonate resin (Panlite AD-5503 (pellet)) of Teijin Chemical Ltd. as a bisphenol A homopolymer with the M35B-D-DM of Meiki Co., Ltd. A standard disk was obtained using this disk substrate. The initial mechanical properties, ΔTilt and loss tangent of this disk were evaluated. The evaluation results are shown in Table 1.

TABLE 1

|  | Cylinder temperature (° C.) | Clamping force (Ton) | Mold temperature (° C.) | Deflection temperature under load (° C.) | Flexural modulus (kgf/cm$^2$) |
|---|---|---|---|---|---|
| Ex. 1 | 320 | 32 | 125 | 130 | 28,000 |
| Ex. 2 |  |  | 120 | 130 | 32,000 |
| Ex. 3 |  |  | 119 | 127 | 25,100 |
| Ex. 4 |  |  | 118 | 127 | 26,100 |
| C. Ex. 1 |  |  | 81 | 89 | 37,000 |
| C. Ex. 2 |  |  | 80 | 89 | 30,000 |
| C. Ex. 3 |  |  | 120 | 127 | 23,900 |

|  | Saturation water absorption (wt %) | Initial mechanical properties (°) | ΔTilt (°) | tanδ | Transcribility (%) |
|---|---|---|---|---|---|
| Ex. 1 | 0.21 | 0.20 | 0.37 | 0.014 | 100 |
| Ex. 2 | 0.25 | 0.20 | 0.46 | 0.039 | 100 |
| Ex. 3 | 0.32 | 0.30 | 0.59 | 0.007 | 100 |

TABLE 1-continued

| | | | | | |
|---|---|---|---|---|---|
| Ex. 4 | 0.30 | 0.35 | 0.53 | 0.009 | 100 |
| C. Ex. 1 | 2.00 | 0.36 | ≧5.00 | 0.078 | 100 |
| C. Ex. 2 | 0.05 | 0.35 | ≦0.01 | 0.015 | 100 |
| C. Ex. 3 | 0.35 | — | 0.7 | 0.006 | 100 |

Ex. = Example,
C. Ex. = Comparative Example

As shown in Table 1, the resins of Example 1 to 4 and the resin of Example 5 have a saturation water absorption of 0.33 wt % or less, a deflection temperature under load of 125° C. or higher and a ΔTilt of 1.0 or less. Since they have a sufficiently high flexural modulus and loss tangent (tan δ), disk vibrating which occurs when optical disks molded therefrom turn at a high speed can be suppressed.

Since PMMA of Comparative Example 1 has a high saturation water absorption of 2.0%, its ΔTilt is very large at 5.0 or more. Therefore, it was found that the resin of Comparative Example 1 is not suitable for practical use. As the polystyrene of Comparative Example 2 has a low water absorption, its ΔTilt can be reduced to a very small value. However, since it has a low glass transition point (Tg), the heat resistance of the obtained disk substrate becomes unsatisfactory.

Since the polycarbonate resin of Comparative Example 3 has a slightly high saturation water absorption of 0.35% and a slightly low flexural modulus, it is not satisfactory in terms of the characteristic properties of an optical disk substrate. Also as it has a maximum change in tilt angle (ΔTilt) of 0.7°, it may have a trouble in reading recorded data. The substrate of Comparative Example 3 has low transcribility and is unsatisfactory in terms of moldability as a substrate.

Effect of the Invention

The optical recording medium of the present invention has at least a reflection layer, recording layer and transparent protective layer formed on a substrate in the mentioned order and is used in an optical disk for recording and/or reproducing an information signal by applying light from the transparent protective layer side. An optical disk having a recording capacity larger than 15 GB on one side of a 12 cm-diameter disk has already been developed. The optical disk substrate of the present invention can be used in such an optical disk without making it complicated in structure.

What is claimed is:

1. An optical recording medium which comprises a 0.3 to 2.0 mm-thick substrate made from a thermoplastic resin and having embossed pits or guide grooves, a reflection layer formed on the substrate and a 3 to 200 μm-thick transparent protective layer formed on the reflection layer and which reproduces recorded information based on a change in the intensity of reflected light by applying a light beam from the surface side of the transparent protective layer, wherein the substrate is formed from a thermoplastic resin which comprises at least 50 wt % of an aromatic polycarbonate resin obtained by polymerizing a dihydroxy compound containing at least one aromatic dihydroxy compound (component A) selected from the group consisting of 1,1-bis(4-hydroxphenyl)-3,3,5-trimethylcyclohexane (component a-1) and 9,9-bis(4-hydroxy-3-methylphenyl)fluorene (component a-2) in an amount of at least 20 mol % based on the total of all the dihydroxy compounds as a bisphenol component.

2. The optical recording medium of claim 1, wherein the substrate is formed from a thermoplastic resin which comprises at least 50 wt % of an aromatic polycarbonate resin obtained by polymerizing a dihydroxy compound containing at least one aromatic dihydroxy compound (component A) selected from the group consisting of 1,1-bis(4-hydroxphenyl)-3,3,5-trimethylcyclohexane (component a-1) and 9,9-bis(4-hydroxy-3-methylphenyl)fluorene (component a-2), and α,α'-bis(4-hydroxyphenyl)m-diisopropylbenzene (component B) in a molar ratio of the component A to the component B of 20:80 to 70:30 as a bisphenol component.

3. The optical recording medium of claim 1, wherein the substrate is formed from a thermoplastic resin having a flexural modulus of 24,000 kgf/cm$^2$ or more.

4. The optical recording medium of claim 1, wherein the substrate is formed from a thermoplastic resin having a saturation water absorption of 0.33 wt % or less.

5. The optical recording medium of claim 1, wherein the substrate is formed from a thermoplastic resin having a deflection temperature under load of 125° C. or higher.

6. The optical recording medium of claim 1, wherein the substrate is formed from a thermoplastic resin having a loss tangent (tan δ) of 0.006 or more.

7. The optical recording medium of claim 1, wherein the substrate is formed from a thermoplastic resin having a transcribility of 95% or more.

8. The optical recording medium of claim 1, wherein the substrate is formed from a thermoplastic resin having a maximum change in tilt angle (ΔTilt) of 0.6° or less.

9. The optical recording medium of claim 1, wherein the substrate is formed from a blend of two or more thermoplastic resins.

10. The optical recording medium of claim 1, wherein the transparent protective layer is formed from the same thermoplastic resin as the thermoplastic resin forming the substrate.

11. The optical recording medium of claim 1 which has a recording layer between the reflection layer and the transparent protective layer.

12. The optical recording medium of claim 11, wherein the reflection layer or the recording layer has a multi-layer structure.

13. An optical recording medium which comprises a 0.3 to 2.0 mm-thick substrate made from a thermoplastic resin and having embossed pits or guide grooves, a reflection layer formed on the substrate and a 3 to 200 μm-thick transparent protective layer formed on the reflection layer and which reproduces recorded information based on a change in the intensity of reflected light by applying a light beam from the surface side of the transparent protective layer, wherein the substrate is formed from a thermoplastic resin having the following characteristic properties (1) to (4):
(1) a flexural modulus of 24,000 kgf/cm$^2$ or more,
(2) a saturation water absorption of 0.33 wt % or less,
(3) a deflection temperature under load of 125° C. or higher, and
(4) a loss tangent (tan δ) of 0.006 or more.

14. The optical recording medium of claim 13, wherein the substrate is formed from a thermoplastic resin having a flexural modulus of 26,000 kgf/cm$^2$ or more.

15. The optical recording medium of claim 13, wherein the substrate is formed from a thermoplastic resin having a saturation water absorption of 0.30 wt % or less.

16. The optical recording medium of claim 13, wherein the substrate is formed from a thermoplastic resin having a deflection temperature under load of 127° C. or higher.

17. The optical recording medium of claim 13, wherein the substrate is formed from a thermoplastic resin having a loss tangent (tan δ) of 0.008 or more.

18. The optical recording medium of claim 13, wherein the substrate is formed from a thermoplastic resin having a transcribility of 95% or more.

19. The optical recording medium of claim 13, wherein the substrate is formed from a thermoplastic resin having a maximum change in tilt angle (ΔTilt) of 0.60 or less.

20. The optical recording medium of claim 13, wherein the substrate is formed from an aromatic polycarbonate resin.

21. The optical recording medium of claim 13, wherein the substrate is formed from a blend of two or more thermoplastic resins.

22. The optical recording medium of claim 13, wherein the transparent protective layer has the characteristic properties (1) to (4) of the thermoplastic resin of claim 13 and is formed from a transparent thermoplastic resin.

23. The optical recording medium of claim 13, wherein the transparent protective layer is formed from the same thermoplastic resin as the thermoplastic resin forming the substrate.

24. The optical recording medium of claim 13 which has a recording layer between the reflection layer and the transparent protective layer.

25. The optical recording medium of claim 24, wherein the reflection layer or the recording layer has a multi-layer structure.

* * * * *